United States Patent [19]

Wenyon

[11] Patent Number: 5,659,408
[45] Date of Patent: Aug. 19, 1997

[54] REFLECTIVE IMAGE-PROVIDING DISPLAY VIEWED WITH HOLOGRAPHICALLY DIFFUSED AMBIENT LIGHT

[75] Inventor: Michael M. Wenyon, Boston, Mass.

[73] Assignee: Polaroid Corporation, Cambridge, Mass.

[21] Appl. No.: 448,747

[22] Filed: May 24, 1995

[51] Int. Cl.$^6$ .............................. G02B 5/32; G02F 1/1335
[52] U.S. Cl. ............................... 359/15; 359/16; 349/64; 349/61; 349/112; 349/113
[58] Field of Search ............................ 359/2, 15, 16, 359/19, 63, 69, 70; 349/61, 64, 112, 113

[56] References Cited

U.S. PATENT DOCUMENTS

| | | | |
|---|---|---|---|
| 3,912,369 | 10/1975 | Kashnow | 350/160 |
| 3,960,438 | 6/1976 | Bonne et al. | 350/160 |
| 4,196,973 | 4/1980 | Hochstrate | 350/338 |
| 4,372,639 | 2/1983 | Johnson | 3509/3.7 |
| 4,545,648 | 10/1985 | Shulman et al. | 350/337 |
| 5,046,793 | 9/1991 | Hockley et al. | 359/12 |
| 5,365,354 | 11/1994 | Jannson et al. | 359/15 |
| 5,418,631 | 5/1995 | Tedesco | 359/15 |
| 5,471,327 | 11/1995 | Tedesco et al. | 359/15 |
| 5,513,019 | 4/1996 | Cueli | 359/2 |
| 5,534,386 | 7/1996 | Petersen et al. | 430/320 |
| 5,594,560 | 1/1997 | Jelley et al. | 359/15 |

FOREIGN PATENT DOCUMENTS

| | | | |
|---|---|---|---|
| 57142608A | 9/1992 | Japan | G02B 7/26 |
| 08220534A | 8/1996 | Japan . | |

OTHER PUBLICATIONS

Meyerhofer, Dietrich, "Holographic and Interferometric Viewing Screens." *Applied Optics.* vol. 12, No. 9. Sep. 1973. pp. 2180–2184.

Tedesco, J.M., L. A. K. Brady, and W. S. Colburn. "Holographic Diffusers for LCD Backlights and Projection Screens." *SID 93 Digest.* 1993. pp. 29–32.

Wadle, Stephen, Daniel Wuest, John Cantalupo, and Roderic S. Lakes. "Holographic Diffusers." *Optical Engineering.* vol. 33, No. 1. Jan. 1994. pp. 213–218.

M. Wenyon and P. Ralli, "Mass Production of Volume Holographic Diffusers," 1994 SID International Symposium Digest of Technical Papers, San Jose, CA (Jun. 14–16, 1994) (ISSN 0097–966X).

A.G. Chen et al., "Holographically Reflective Liquid Crystal Display", SID 1995 Symposium Proceedings (May 23, 1995).

"IMAGIX™ Holographic Reflectors", Polaroid Promotional Product Brochure (publicly distributed May 23, 1995).

PCT International Search Report for PCT/US96/06852 (Forms PCT/ISA/210 and 220) (mailed Aug. 23, 1996).

*Primary Examiner*—Paul M. Dzierzynski
*Assistant Examiner*—Audrey Chang
*Attorney, Agent, or Firm*—Renato M. de Luna

[57] ABSTRACT

Reflective image-providing displays viewed with holographically diffused light are provided. As one particular and preferred embodiment, a liquid crystal display component is presented comprising a liquid crystal display element backed with a reflective transmission holographic diffuser. Images of good contrast may be displayed and viewed from the liquid crystal display component under ambient lighting conditions and without further requirement of supplemental light sources, such as edge-lighting and backlighting.

20 Claims, 1 Drawing Sheet

REFLECTIVE IMAGE-PROVIDING DISPLAY VIEWED WITH HOLOGRAPHICALLY DIFFUSED AMBIENT LIGHT

FIELD OF THE INVENTION

In general, the present invention relates to reflective image-providing displays viewable under ambient light without requirement of supplemental edge lighting or backlighting. More particularly, the present invention relates to an image-providing display element (such as a liquid crystal display element) made viewable reflectively by the combination therewith of a reflective holographic diffuser, the reflective holographic diffuser comprising a holographic transmission diffuser and a light reflective layer.

BACKGROUND OF THE INVENTION

Electro-optical display devices are the object of considerable research efforts. Of the various display systems that have been developed, thin flat-panel display devices utilizing, for example, liquid crystal components are of particular commercial interest.

Compositions characterized as liquid crystals include a wide range of materials. The different electrical and optical properties exhibited by these liquid crystalline materials make possible a number of mechanisms for light modulation. Such mechanisms include phase transitions, dynamic scattering, and field effects, all of which are well known in the art.

Field effect devices are of particular utility. The effect that is commercially most significant at present is the rotation of polarized light by a twisted nematic liquid crystal alignment and the disappearance of this effect when an electric field is applied across the device. Twisted nematic liquid crystal devices typically comprise a suitable liquid crystal composition confined between two optically transmissive plates, the plates having transparent conductive films affixed to their surfaces facing one another in the device. The alignment of the surface layers of the liquid crystal in the "off" state of the device is determined by the interaction of the liquid crystal composition with the confining surfaces of the display device. The orientation of the surface layers of the liquid crystal is propagated throughout the bulk of the composition.

To effect orientation of a confined liquid crystal, the internal surfaces of the conductive plates of a sandwich display device can be prepared by unidirectionally rubbing the surfaces prior to fabrication of the device. The liquid crystal molecules immediately adjacent each rubbed surface tend to orient themselves in the same direction as the rubbing. By arranging the opposing conducting plates with the axis of the rubbed surface at, for example, fight angles to each other, the liquid crystal molecules at points intermediate the two plates will orient themselves to a degree which is a function of the distance from the two plates. Accordingly, in this example, the liquid crystal will align itself in a continuous spiral path that twists through the 90° angle between the opposing plates.

If the light-rotating liquid crystal "sandwich" is mounted between two crossed light polarizer elements, polarized light will pass into the device and be rotated through a 90° angle as it is transmitted through the twisted nematic crystal composition from one surface of the device to the other. Due to the 90° light rotation effected by the twist of the liquid crystal, the polarized light will be set to pass through the second crossed polarizer mounted on the opposing side of the display. In the prior art, it is known that by positioning a light reflector behind the second polarizer, the polarized light can be reflected back through the second polarizer to pass through and be rotated by the confined liquid crystal and then exit out the first polarizer where it was introduced.

When an electric field is applied across the liquid crystal composition between the two conductive plates, the twisted orientation of the liquid crystal is obliterated as the molecules align themselves with the applied field. As the liquid crystal is untwisted, polarized light entering the device through the first polarizer will no longer be rotated 90° as it is transmitted through the liquid crystal. Therefore, the non-rotated light will be unable to pass through the second polarizer which is set correspondingly crossed to the first polarizer. Selective application of voltages across discrete segments of the liquid crystal device can readily accomplish patterns of bright areas (no applied electric field, resulting in reflected light) and dark areas (applied electric field, resulting in no reflected light).

Operation of the liquid crystal display device, as described above, is in part dependent upon the optical character and intensity of the light introduced in the device. Under conditions of sufficient ambient light, the reflective illumination arrangement is adequate. However, reduced ambient light may diminish suitable contrast for the display device. Such reduced contrast is addressed in the prior art by supplying an internal, supplemental light means to enhance illumination and make the display more desirably readable. However, the incorporation of supplemental light sources adds undesirable bulk to the display and increases power requirements. With regard to power requirements, it will be readily appreciated that in conventional devices employing LCD displays (e.g., wrist watches, calculators, personal digital assistants, cellular telephone displays, and laptop computers) backlighting and edge-lighting are oftentimes the greatest source of power drain. With the attractive features of "compactness" and portability diminished by addition of supplemental light and bulky power sources, there is need for a display that is adequately viewable under ambient light without requirement of supplemental edge-lighting or backlighting.

SUMMARY OF THE INVENTION

Responsive to the above need, it has been found that displays adequately viewable under ambient light may be provided by replacing conventional reflectors (or transflectors) with a reflective holographic diffuser, the reflective holographic diffuser comprising a holographic transmission diffuser and a reflection layer. The holographic transmission diffuser may be made to diffuse light in controlled output cones, enhancing brightness at predetermined desirable angular ranges.

In the use of a liquid crystal display incorporating such reflective holographic diffuser, polarized ambient light passing through a liquid crystal display element therein is transmitted through the holographic transmission diffuser, reflected by the reflection layer, then retransmitted as diffused light toward and through the liquid crystal display element.

In the absence of the insights provided by present invention, it would appear that the functionality of a reflective holographic diffuser could be accomplished simply by a volume phase reflection hologram. However, it is noted that when reflection holograms are made—i.e., by reference waves and object waves impinging from opposite sides of a photopolymeric holographic medium—a "color-filtering", 'half-wave' stack of interference fringes extending through the thickness of the photopolymer results. For display holograms, a half-wave stack fosters good resolution by narrowing the band of wavelengths utilized for image reconstruction. For holographic diffuser applications, however, image resolution is unimportant, and that an achromatic bandwidth would produce a brighter display with a more desirable 'paper white' appearance.

An achromatic hologram based on a volume reflection hologram is possible. For example, achromaticity may be accomplished by multiple exposures to get a red, a blue, and a green hologram recorded on the same medium. Alternatively, non-standard chemical and optical processes can be employed to extend the bandwidth of an essentially monochromatic hologram. Regardless of the selected methodology, the steps involved would be comparatively complicated and costly.

Accordingly, with the realization that achromaticity is best accomplished by utilization of a volume phase transmission hologram, the present invention provides an easily produced and aesthetically desirable reflective holographic diffuser.

In one principle and preferred embodiment, the present invention encompasses a liquid crystal display comprising a liquid crystal display element made viewable reflectively by the combination therewith of a reflective holographic transmission diffuser. An envisioned liquid crystal display element comprises a liquid crystal cell, a plurality of selectively actuatable electrode segments, and first and second polarizers on front and rear plates of the cell. In accordance with the present invention, the holographic diffuser—comprising a transmission hologram and a light-reflective layer—is positioned proximate to the liquid crystal display element.

Aside from its preferred and principle use in a liquid crystal display, it will be readily appreciated that application of the reflective holographic diffuser can achieve similar utility as a light-manipulating reflective backing for virtually any image-providing display having therein a display element imagewise viewable by transmitted light. Such combinations are encompassed herein.

It is a principal object of the present invention to provide a display viewable under ambient light without requirement of a supplemental internal light source, thereby reducing bulk and power requirements.

It is another object of the present invention to provide a liquid crystal display having a liquid crystal display element backed with a reflective holographic transmission diffuser.

It is another object of the present invention to provide a liquid crystal display having a liquid crystal display element backed with a reflective holographic transmission diffuser, wherein the reflective holographic transmission diffuser is based on a volume phase (desirably achromatic) transmission hologram.

It is another object of the present invention to provide a liquid crystal display having a liquid crystal display element backed with a reflective holographic transmission diffuser, wherein the reflective holographic transmission diffuser is based on an embossed (or so-called "surface relief") transmission hologram, whereby the liquid crystal display element may be mass produced economically.

It is another object of the present invention to provide a display viewable by reflection comprising an image-providing display element (e.g., addressable electrooptical display elements, or static light-transmissive images) and a reflective holographic diffuser, the display element providing an image viewable by the transmission of light therethrough; the reflective holographic diffuser positioned proximate to the display element; the reflective holographic diffuser comprising a light reflective layer and a holographic transmission diffuser.

It is another object of the present invention to provide a liquid crystal display comprising a liquid crystal display element and a reflective holographic diffuser; the liquid crystal display element having an arrangement of front and rear light polarizers sandwiching front and rear optically transmissive plates with a layer of twisted nematic liquid crystal composition confined therebetween, and means to impose a voltage between selected portions of the front and rear optically-transmissive plates; the reflective holographic diffuser positioned proximate to the liquid crystal display element; the reflective holographic diffuser comprising a light reflective layer and a holographic transmission diffuser.

Other features and advantages of this invention will become apparent from the following detailed description of the presently preferred embodiments of the invention, taken in conjunction with the accompanying drawing.

BRIEF DESCRIPTION OF THE DRAWING

FIG. 1 depicts a liquid crystal display 10 comprising an LCD element (or "stack") 200 backed with a reflective holographic transmission diffuser 100, the liquid crystal display 10 viewable against diffuser 100 by an observer 70 under ambient light 60. The relative locations, shapes, and sizes of objects have been exaggerated to facilitate discussion and presentation herein. Especially exaggerated are the thickness of cell 20 and electrodes 26 and 28, which together will typically have a thickness of about one mil (0.0254 mm).

DETAILED DESCRIPTION OF THE INVENTIVE SUBJECT MATTER

Figure 1:
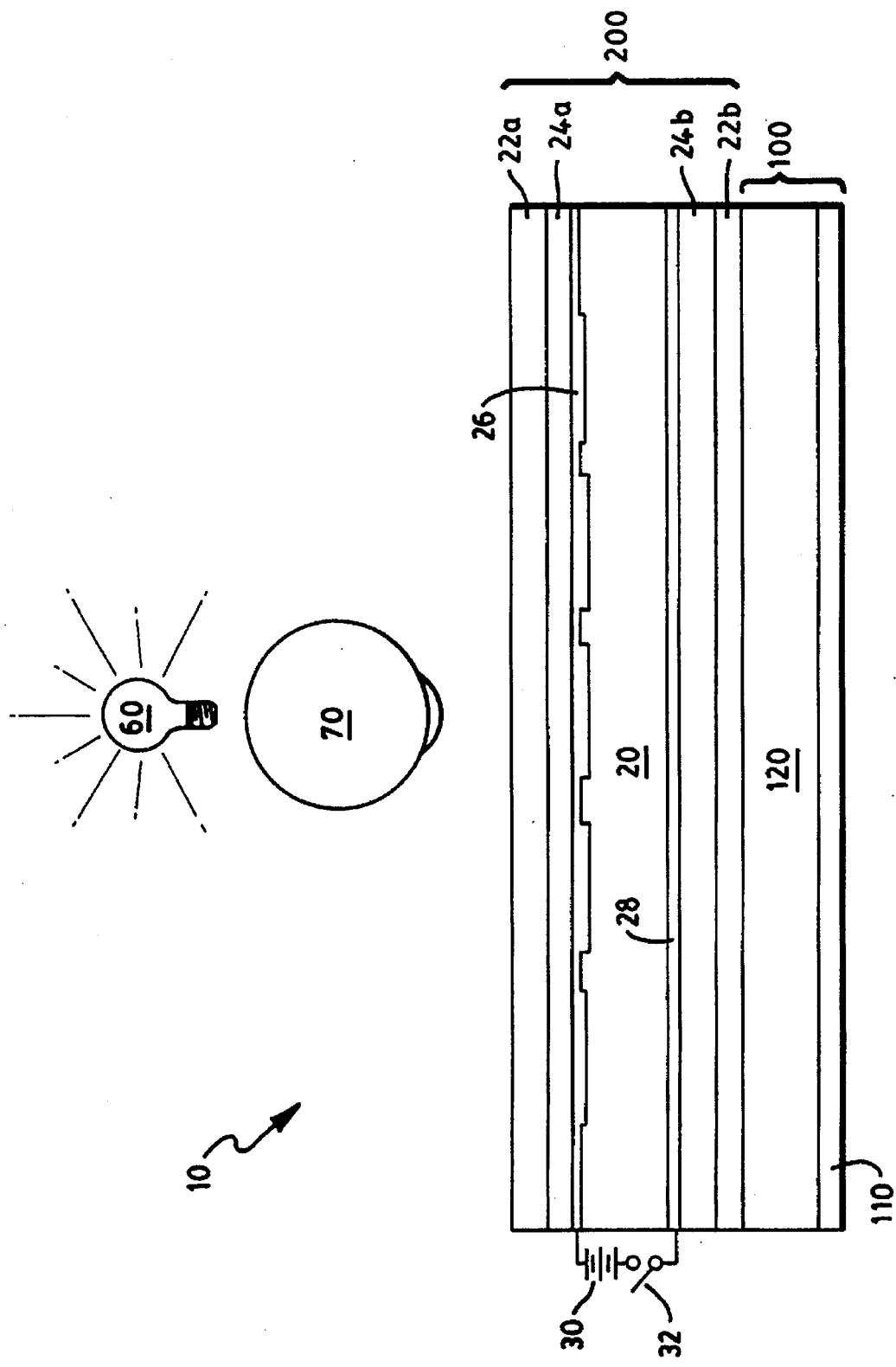
FIG. 1 provides a schematic representational illustration of one embodiment of the present invention. In particular.

The present invention encompasses a display viewable by reflection, the display comprising an image-providing display element and a reflective holographic diffuser. The image-providing display element is one that is capable of providing an image viewable by the transmission of light therethrough. Examples of such images include, but are not limited to, images produced by addressable electrooptical devices, such as liquid crystal display elements and electrophoretic display elements; and static light-transmissive images, such as binary images provided on a light-transmissive substrate and photographic slides. In accordance with the present invention, the reflective holographic diffuser is positioned proximate to (e.g., spaced apart proximately or contiguous with) the image-providing display element, whereby the image-providing display element is made reflectively viewable. The reflective holographic diffuser comprises a light-reflective layer and a holographic transmission diffuser.

With regard to embodiments involving static light-transmissive images, by way of illustration, a reflective holographic transmission diffuser can be applied onto, for example, an initially light-transmissive display in the nature of a "sign", thus converting said sign to a reflectively-viewable sign. A resultant sign can be made to utilize ambient light to give the effect of an electrically illuminated backlit sign. In such embodiment, the sign may utilize an "off-axis" diffuser which would take incident overhead light and reflect it horizontally toward a predetermined viewing location. Similar use of the reflective holographic diffuser as a light-manipulating backing can be accomplished with photographic slides or other like imaged transparencies. In such embodiments, due to relatively more relaxed optical requirements, the reflected holographic diffuser need not be based on the combination of a holographic transmission diffuser and reflection layer. Although still confined by the aforediscussed inherent limitations, a reflective holographic diffuser based on a volume phase reflection hologram can be employed. The combination of a holographic transmission diffuser and reflection layer is nonetheless preferred.

With regard to embodiments involving addressable electrooptical devices, in a principle and preferred embodiment, the present invention provides a reflectively viewable liquid crystal display. The liquid crystal display comprises a liquid crystal display element and a reflective holographic diffuser. An envisioned liquid crystal display element comprises a liquid crystal cell, a plurality of selectively actuatable electrode segments, and first and second polarizers on front and rear sides of the cell. In accordance with the present invention, the reflective holographic diffuser—comprising a holographic transmission diffuser and a light-reflective layer—is positioned proximate to the liquid crystal display element.

The term "proximate" is used in the context of the relation between the display element and the reflective holographic diffuser element to refer to the positioning of such elements in a contiguous, i.e., face-to-face relation, or in a separated (spaced-apart) relation. The space between the separated elements can be held in spaced-apart relation by frame means (not shown) adequate to hold the elements as a unitary structure. Alternatively, such elements can be joined to one another through one or more thin layers or substrates. For example, a plastic substrate, additionally carrying coated or other layers, can be employed as a suitable support material for carrying on each of the respective sides thereof the image-providing display element and the reflective holographic diffuser, respectively, affixed directly to such substrate or indirectly through adhesive or other layers. In general, substrates, coatings or layers between the image-providing display element and the reflective holographic diffuser will be selected with consideration given to the possible interference of such substrates, coatings or layers with the desired viewing of the display image against the background of the reflective layer of the holographic diffuser. From the standpoints of compactness and ease of manufacture, it will be preferred that image-providing display element and the reflective holographic diffuser be embodied into a unitary structure by affixing such elements to one another, preferably through a suitable adhesive layer.

As used herein, the term "liquid crystal" is used to refer to molecules with anisotropic geometry, such as rod-shaped or disc-shaped, that exhibit stable states intermediate between liquid and solid, and which have comparatively low molecular weights. While discussed primarily with reference to twisted nematic liquid crystals, the liquid crystal medium of the present invention may contain any such liquid crystal compound useful in liquid crystal displays, or mixtures of such liquid crystal compounds. Useful are thermotropic liquid crystals which exhibit nematic and smectic (including ferroelectric) phases. Nematic phases include conventional uniaxial nematics, twisted nematics, and cholesteric mesophases.

Referring to FIG. 1, the depicted liquid crystal display sandwich-like unit 200 comprises a first optically transmissive plate 24a supporting a conductive element 26 on its interior surface. Plate 24a may be made of any suitable transparent or translucent sheet material including glass, plastic, and the like. Conductive element 26, which is typically imagewise arranged as shown in FIG. 1, can be made from any conductive material of suitable optical quality; transparent conductive coatings of metallic oxides, such as tin oxide, are well known in the art. Set opposite plate 24a is a second optically transmissive plate 24b, which also includes on its surface, facing plate 24a, a conductive layer 28. Plate 24b and conductive layer 28 may be composed of the same materials as plate 24a and conductive element 26. Sandwiched between the two plates is a layer of a twisted nematic liquid crystal composition 20. Set on either side of the sandwich arrangement are front polarizer 22a and rear polarizer 22b whose polarizing axes are disposed at right angles to each other. Behind rear polarizer 22b is positioned reflective transmission holographic diffuser 100.

Conductive coatings 26 and 28 are connected by suitable electrical leads so that a voltage can be applied across liquid crystal composition 16 by means of an electrical source 30. The schematic diagram illustrates only one element 30 connected to the electrical source, but means are commonly available in the art for selectively activating each of the image elements for forming the desired display.

In order to effect the desired twist to the confined nematic light crystal composition, the interior conductive surfaces of plates 24a and 24b are unidirectionally rubbed, the axes of the rubbed surface offset (e.g., at an angle of 90°, or 45° in so-called quarter-wave plates) from each other.

Light entering the front of the display device through the front polarizer 22a will pass through optically transmissive plate 24a and conductive coating 26 and enter the liquid crystal composition layer 20, the polarized beam of light will follow the twist formed in the liquid crystal and rotated at the offset angle, so that upon reaching the correspondingly crossed polarizer 22b, after passing through the second optical transmissive plate 24b and conductive layer 28, the light will be transmitted through the polarizer to be reflected by the reflective transmission holographic diffuser 100. The reflected light, retracing the same route in reverse will pass through the sandwich arrangement and be readily reversed.

The polarizers 22a and 22b may comprise any of a variety of materials which produce the desired light-polarization effects. Preferred, and the most widely used type of synthetic polarizer, is the polyvinyl alcohol-iodine complex polarizer; it comprises a unidirectionally stretched, linearly oriented polyvinylalcohol sheet, supported on a suitable transparent, isotropic plastic material (e.g., cellulose acetate butyrate), and stained with a polyiodide solution. Such polarizers are commonly available from Polaroid Corporation as type H polarizer sheet. Suitable polarizing materials are further described in U.S. Pat. Nos. 2,173,304; 2,255,940; 2,306,108; 2,397,231; 2,445,555; 2,453,186; and 2,674,159.

In accordance with the present invention, a liquid crystal display element, such as the liquid crystal display sandwich-like unit 200 depicted in FIG. 1, is made reflectively viewable by combination therewith of a reflective holographic diffuser. In FIG. 1, the reflective holographic diffuser 100 is positioned proximate to the liquid crystal display element 200. While a comparatively thin (and thereby desirable) liquid crystal display is accomplished by affixing (e.g., by use of a optical adhesive) the reflective holographic diffuser directly onto a liquid crystal display element, the diffuser need not be used in such manner to achieve the goals of the present invention. For example, in certain embodiments, it is envisioned that an optically transmissive spacer layer (e.g., an air void, or a light attenuating filter) may be interposed between reflective holographic diffuser 100 and liquid crystal display element 200. Although reflective holographic diffuser 100 and light crystal display element 200 would be non-contiguous, they are for the present invention considered proximate.

As schematically depicted, the reflective holographic diffuser 100 comprises a light reflective layer 110 deposited (adhered, or otherwise fixed or mounted) onto the holographic transmission diffuser 120. As with the relative positioning of the liquid crystal display element 200 and the reflective holographic diffuser 100, while a comparatively thin (and thereby desirable) reflective holographic diffuser is accomplished by direct deposition of a light reflective layer onto a holographic transmission diffuser, when the diffuser is not based on an embossed hologram, such direct deposition is not presently contemplated as necessary to achieve the goals of the present invention. For example, to add rigidity to a flexible volume-phase holographic transmission diffuser, it is envisioned that an optically transparent support (not shown) may be interposed between light reflective layer 110 and the holographic transmission diffuser 120.

Light reflective layer 110—typically a metallic foil—may be composed of, for example, an aluminum-vapor-deposited polyester film having a thickness of 100 μm. Light reflective layer 110 may be a mirror, such as those made from silvered glass, glass with a conventional gray filter, polystyrene of gray or silver hue, or polypropylene. Light reflective layer 110 may also be prepared from a composition comprising reflective pigments dispersed in a suitable macromolecular organic binder.

Reflective pigments include highly reflective metallic pigments, such as will be well known to those skilled in the art. While highly reflective metallic pigments provide comparatively better reflectivity in embodiments utilizing pigment dispersions, it is envisioned that for certain purposes other less reflective pigments may be contemplated such as titanium dioxide, zinc oxide, zinc sulfide, lead carbonate, carbon white (i.e. fluorinated carbon black), polymers with encapsulated air voids, calcium carbonate, calcium sulfate, antimony oxide, magnesium carbonate, strontium sulfate, barium sulfate, barium carbonate, calcium silicate, and silicon oxide. Such "lesser" reflective pigments are contemplated for use in embodiments wherein the reflective holographic diffuser is utilized to "convert" an imaged transparency into a reflection image. In this regard, reference may be made to pending, commonly assigned U.S. Pat. No. 5,486,397, filed by James N. Gordon and Ganghui Teng on Apr. 29, 1994, the subject matter of which is to be incorporated herein.

It will be appreciated that light reflective layer 110 may be configured to transmit some degree of light, thereby providing an embodiment wherein the reflective holographic transmission diffuser can be utilized as a transflector. In this regard, nacreous pigments such as discussed in U.S. Pat. No. 4,545,648, issued to J. Shulman and D. L. Clifford on Oct. 8, 1985, may also be considered.

Any binder medium capable, on drying, of effectively "holding" the selected pigments in a substantially uniform dispersion can be used. A wide choice of binders can be employed, favorable coatability and lack of optical interference being important selection criteria. Other factors that should be considered in binder selection are desired coating viscosity, moisture resistance of the dried coating, coating durability, an advantageous solvent system, and the like. Preferably, a binder medium should have a low refractive index. Macromolecular binders that can be used include: vinylidene chloride copolymers (e.g., vinylidene chloride/acrylonitrile copolymers, vinylidene chloride/methylmethacrylate copolymers and vinylidene chloride/vinyl acetate copolymers); ethylene/vinyl acetate copolymers; cellulose esters and ethers (e.g., cellulose acetate butyrate, cellulose acetate propionate, and methyl, ethyl benzyl cellulose); synthetic rubbers (e.g., butadiene/acrylonitrile copolymers; chlorinated isoprene and 2-chloro-1,3-butadiene polymers); polyvinylesters (e.g. vinyl acetate/acrylate copolymers, poly(vinyl acetate) and vinyl acetate/methylmethacrylate copolymers); acrylate and methacrylate copolymers (e.g., polymethylmethacrylate); vinyl chloride copolymers (e.g., vinyl chloride/vinylacetate copolymers); and diazo resins such as the formaldehyde polymers and copolymers of p-diazo-diphenylamine. Depending on the binder and reflective pigment utilized, the reflective layer formulations can also include surfactants, dispersal agents, and/or plasticizers.

To provide the holographic transmission diffuser in a typical embodiment, an object (or the surface thereof) having desirable light diffusing capacity is holographically recorded in a holographic medium as an interference pattern (e.g., a fringe pattern or surface relief pattern) provided by the combination of an object beam and a reference beam in the holographic medium. During recordation, an object beam impinges upon the holographic medium subsequent to interruption by a suitable light diffusing object (or surface thereof), such as ground glass or white tile. At the same time, a reference beam uninterrupted by the object impinges upon the holographic medium from the same side. In accomplishing recordation, both on-axis and off-axis exposure geometries may be implemented. In either case, the volume transmission hologram will be produced having holographically recorded therein the desired optical properties of the light diffusing object.

The exposure time may be readily determined by routine testing, as is well known in the art, and will vary according to the intensity of the exposing radiation, the distance from the object to the recording media, and like factors. These factors may be varied as necessary to change the exposure duration, either shorter or longer, as desired to obtain the preferred combination of exposure duration and light intensity for a given recordation. It will be appreciated that in the formation of a volume phase hologram on DMP-128, a subsequent non-imagewise or flood exposure to white light is useful to "fix" the photopolymerizable layer.

In the design of the holographic transmission diffuser 120, it will be appreciated that the performance of the display 10 for viewing by an observer 70 is dependent upon the brightness and resolution of the image as perceived by a person in a particular angular position. In displays employing conventional reflectors, oftentimes the brightness of the image in a particular portion of the screen varies with the viewer's position. The screen is not at the same brightness over the whole area, and the distribution of light on the screen makes it difficult for the viewer to observe all parts of the viewing screen and extract information therefrom with reliability. Accordingly, to gain advantage from the optical design flexibility provided by holographic manufacturing processes, in the design of holographic transmission diffuser 120, it is desirable to define an output cone ("zone", or "pupil") through which the majority of the light from the display screen is propagated. When light can be propagated toward such defined output cone, with little scattering elsewhere, then brightness is controlled and enhanced ("gain") because less light is "wasted" to scattering. Additionally, it will be noted that a decrease in "pupil size" will result in a proportional increase in "gain". Advantage from such relation is obtained, for example, in displays designed with a comparatively reduced viewing zone. Such viewing zone would have good brightness and enhanced viewing privacy.

While it is a goal of the present invention to provide liquid crystal display embodiments incorporating a reflective holographic diffuser 100 capable of producing (by reflection) an output cone of diffused light having gain within predetermined angular ranges, it will be appreciated that the full scope of the present invention is not limited to any particular predetermined optical characteristic of the holographic transmission diffuser 120. Holographic transmission diffusers having any variety of light diffusing functionality can be utilized depending on the requirements of particular applications. As evident from the literature, species of holographic transmission diffusers are several and various. See e.g., S. Waddle, et al., *Holographic Diffusers*, OPTICAL ENGINEERING, Vol. 33, No. 1, p.213 et seq. (January 1994); D. Meyerhofer, *Holographic and Interferometric Viewing Screens*, APPLIED OPTICS, Vol. 12, No. 9, p.2180 et seq. (September 1973); J. M. Tedesco, et al., *Holographic Diffusers for LCD Backlights and Projection Screens*, SID 93 DIGEST, Ch. 5.3, p.29 et seq. (1993). See also, U.S. Pat. No. 5,365,354 (Jannson et al.) and U.S. Pat. No. 5,046,793 (Hockley et al.). The teachings found in these and other like references can be utilized in embodiments of the present invention by those skilled in the art in view of the teachings disclosed herein.

Recording media used for transmission hologram diffuser 120 in the present invention can be made of a variety of materials. Among the more important are: silver halide emulsions, hardened dichromated gelatin, ferroelectric crystals, photopolymers, photochromics, and photodichroics. Characteristics of these materials are given in *Volume Holography and Volume Gratings*, by L. Solymar and D. J. Cook, Chapter 10, Academic Press, New York, 1981, pages 254–304. Compositions that may be considered for use include DMP-128 (a proprietary photopolymer from Polaroid Corporation), dichromated gelatin, silver-halide based compositions, and compositions described in U.S. Pat. No. 4,588,664, issued to F. L. Fielding and R. T. Ingwall on May 13, 1986, and U.S. Pat. No. 4,696,876, issued to J. J. Cael on Sep. 29, 1987. For volume-phase holograms, DMP-128 is the preferred material and generally comprises a dye sensitizer, a branched polyethylenimine, and a free radical polymerizable ethylenically unsaturated monomer. Particular details of the composition may be found in the aforecited U.S. Pat. No. 4,588,664. See also, W. C. Hay and B. D. Guenther, "Characterization of Polaroid's DMP-128 Holographic Recording Medium", *Proceedings of the SPIE*, 883, pp. 102–105 (1988). Certain details relating to the use of DMP-128 for the production of transmission holographic diffusers may be found in M. Wenyon and P. Ralli, *Mass Production of Volume Holographic Diffusers*, 1994 SID INTERNATIONAL SYMPOSIUM DIGEST OF TECHNICAL PAPERS, San Jose, Calif. (Jun. 14–16, 1994) (ISSN 0097–966X).

The coating thickness of the photoactivatable composition is not particularly critical and can be selected according to the features and aspects desired in the resultant hologram. Illustratively, for example, the dry thickness of the layer of photopolymerizable composition based on DMP-128 will be about 2–10 microns, although coatings may be as thick as 25–30 microns for certain applications.

Subsequent to its exposure, the recording medium can then be processed to develop the recorded latent interference pattern of the diffuser and thereby produce a transmission hologram. In a particular mode of practice, the recording medium is developed, for example, to intensify the imaged element (such as by treatment with 2-isopropanol in the case of DMP-128), or to "fix" (or otherwise make more stable) photopolymeric reaction products (cf., fringe structures) actinically generated by the irradiation. Certain details concerning the use and processing of photopolymerizable compositions used for holographic recordings can be found, for example, in U.S. Pat. No. 4,588,664, issued to H. L. Fielding and R. T. Ingwall on May 13, 1986; U.S. Pat. No. 4,696,876, issued to J. J. Cael on Sep. 27, 1987, and U.S. Pat. No. 5,198,912, issued to R. T. Ingwall, M. A. Troll, and D. H. Whitney on Mar. 30, 1993. Those skilled in the art will know of the various methods for processing the various types of recording media that can be used in the present invention. It will be appreciated that subsequent processing will depend on the nature of the selected recording medium. Accordingly, construction of the term "development" will compel consideration of the processes desired and/or required to finalize, or otherwise prepare for use, a particular imaged recording medium.

The production of original volume phase transmission holograms may be inconsistent with desirable product process times. Accordingly, an original hologram may be utilized as a master for the mass production of several duplicate holograms. In this regard reference is made to commonly assigned U.S. Pat. No. 5,576,853, filed by W. Molteni and M. Wenyon on Dec. 20, 1994.

For the present invention, it is not required that transmission holographic diffuser 120 be prepared as a volume transmission hologram. Transmission holographic diffuser 120 may also be prepared as a light transmissive layer having a holographically produced "surface relief" pattern. When "backed" with, for example, a conforming reflective film, the resultant embossed display hologram may be deposited onto the liquid crystal display element in the same manner as the reflective volume phase transmission hologram.

An embossed reflective display hologram is typically formed from an off-axis master hologram in a multi-step process. The first step usually involves making the master off-axis hologram where the desired light-diffusing object is positioned some distance from the surface of the recording medium and the reference beam is a collimated or parallel beam. The second step usually involves exposing the master off-axis hologram with a collimated beam of light to project a real image of the object into space.

A second hologram is then made by positioning a new recording medium at the position of the projected real image and by introducing a new reference beam at an angle. In making embossed holograms, the recording medium used in this second step is typically a photoresist. A suitable photoresist would be one which, when holographically exposed and developed, yields a surface profile whose depth is proportional to the intensity of the incident irradiation.

The third step of making an embossed hologram usually involves coating the surface of the holographic photoresist exposed in the second step with a conducting metal, such as silver, then immersing the coated hologram in an electroplating bath to plate a layer, such as a layer of nickel, thereon. The fourth step involves using the nickel plate layer as a hard master to emboss the interference pattern into plastic that has been softened by heat, pressure, solvents, or some combination thereof in a continuous fashion. For the purposes of the present invention, this embossed hologram intermediate (i.e., a light transmissive layer having a holographically produced "surface relief" pattern) is construed as the holographic transmission diffuser 120.

Finally, in the last step, after embossing, the embossed surface relief pattern is coated with a highly reflecting metal, like aluminum. For the purposes of the present invention, such highly reflective metal coating is construed as the light reflective layer 110. Good reflective reconstruction is accomplished when the reflective layer closely corresponds with the "topography" of the embossed surface relief pattern. Provided with such "form-following" reflective layer, the resultant embossed hologram may be applied in accordance with the present invention with the reflective layer either facing toward or facing away from the image-providing display element, the former being preferred. In the latter case, the conforming reflective layer is exposed, susceptible to physical damage (e.g., scratches, abrasions, and the like), and accordingly, is desirably protected with, for example, a durable protective overcoat.

It will be appreciated that in using an embossed diffuser hologram for reflective transmission diffuser hologram 100, an aesthetically desirable liquid crystal display is obtained by configuring the embossed hologram—in departure from the popular configurations of embossed holograms used for display purposes—as an achromatic hologram. Manufacture of an achromatic embossed hologram is best accomplished by employing a full-aperture exposure of the master hologram. By use of an achromatic hologram, a paper-like ("whitish") background for the liquid crystal display can be accomplished. The aforediscussed volume phase transmission holograms likewise also provide aesthetic desirability when configured as an achromatic hologram.

Those skilled in the art, having the benefit of the teaching of the present invention set forth herein, can effect numerous modifications thereto. These modifications are to be construed as being encompassed within the scope of the present invention as set forth in the appended claims. For example, the disposition of the individual polarizer elements within a twisted nematic liquid crystal display can readily be modified to assume a parallel rather than a crossed relationship. In this arrangement, display areas across which an electric field is applied will appear bright from reflected light and areas not affected by an electric field will remain dark. Further although the present invention has been described primarily in conjunction with liquid crystal electrooptical display devices, it is reemphasized that the present invention is not limited to such particular devices. Utility provided by the incorporation of a reflective holographic transmission diffuser extends to any other illuminated electrooptical device, including electrochromic, electrophoretic, electrolytic, and the like, as well as to any other displays capable of providing an image viewable by the transmission of light therethrough.

I claim:

1. A display viewable by reflection comprising an image-providing display element and a reflective holographic diffuser; the image-providing display element capable of providing an image viewable by the transmission of light therethrough; the reflective holographic diffuser being positioned proximate to the image-providing display element for viewing of the image thereagainst; the reflective holographic diffuser comprising a light reflective layer and a holographic transmission diffuser, the holographic transmission diffuser said display diffuse light upon propagation therethrough of ambient light transmitted through said display element and reflected by said reflective layer, said diffuse light having gain within a predetermined viewing angle.

2. The display of claim 1, wherein the display element is a liquid crystal display element, the liquid crystal display element having an arrangement of front and rear light polarizers sandwiching front and rear optically-transmissive plates with a layer of twisted nematic liquid crystal composition confined therebetween, and means to impose a voltage between selected portions of the front and rear optically-transmissive plates.

3. The display of claim 2, wherein the light reflective layer is deposited directly onto the holographic transmission diffuser, and the reflective holographic diffuser is affixed directly to the liquid crystal display element, whereby the liquid crystal display is a monolithic, integral liquid crystal display.

4. The display of claim 2, wherein the light polarizer comprises a unidirectionally stretched, polyiodide solution, and supported on a sheet of cellulose acetate butyrate.

5. The display of claim 2, wherein the holographic transmission diffuser is designed with at least one output cone of diffused light having gain within predetermined angular ranges.

6. The display of claim 1, wherein the holographic transmission diffuser is a volume phase transmission hologram.

7. The display of claim 6, wherein the holographic transmission diffuser is prepared from a photopolymeric formulation comprising a dye sensitizer, a branched polyethylenimine, and a free radical polymerizable ethylenically unsaturated monomer.

8. The display of claim 6, wherein the volume phase transmission hologram is achromatic.

9. The display of claim 1, wherein the holographic transmission diffuser is an embossed hologram.

10. The display of claim 9, wherein the embossed transmission hologram is achromatic.

11. A monolithic integral display viewable by reflection comprising image-providing display element and a reflective holographic diffuser; the image-providing display element capable of providing an image viewable by the transmission of light therethrough; the reflective holographic diffuser being affixed directly to the image-providing display element for viewing of the image thereagainst; the reflective holographic diffuser consisting essentially of a light reflective layer and a holographic transmission diffuser, the light reflective layer being affixed directly to the holographic transmission diffuser, the holographic transmission diffuser producing diffuse light upon propagation therethrough of ambient light transmitted through said display element and reflected by said reflective layer, said diffuse light having gain within a predetermined viewing angle.

12. The monolithic integral display of claim 11, wherein said image-providing display element is a static light-transmissive image.

13. The monolithic integral display of claim 11, wherein said image-providing display element is a liquid crystal display element.

14. The monolithic integral display of claim 13, wherein the liquid crystal display element has an arrangement of front and rear light polarizers sandwiching front and rear optically-transmissive plates with a layer of twisted nematic liquid crystal composition confined therebetween, and means to impose a voltage between selected portions of the front and rear optically-transmissive plates.

15. The monolithic integral display of claim 14, wherein the light polarizer comprises a unidirectionally stretched, polyiodide solution, and supported on a sheet of cellulose acetate butyrate.

16. The monolithic integral display of claim 13, wherein the holographic transmission diffuser is a volume phase transmission hologram.

17. The monolithic integral display of claim 16, wherein the holographic transmission diffuser is prepared from a photopolymeric formulation comprising a dye sensitizer, a branched polyethylenimine, and a free radical polymerizable ethylenically unsaturated monomer.

18. The monolithic integral display of claim 16, wherein the volume phase transmission hologram is achromatic.

19. The monolithic integral display of claim 11, wherein the holographic transmission diffuser is an embossed hologram.

20. The monolithic integral display of claim 19, wherein the embossed transmission hologram is achromatic.

* * * * *

UNITED STATES PATENT AND TRADEMARK OFFICE
CERTIFICATE OF CORRECTION

PATENT NO. : 5,659,408
DATED : Aug. 19, 1997
INVENTOR(S) : Michael M. Wenyon

It is certified that error appears in the above-identified patent and that said Letters Patent is hereby corrected as shown below:

| | |
|---|---|
| Col. 1, line 49, | delete "fight" and insert therefor --right--. |
| Col. 4, line 20, | delete "nil" and insert therefor --mil--. |
| Col. 4, line 41, | delete "fight-transmissive" and insert therefor --light-transmissive --. |
| Col. 11, line 25, | delete "said display" and insert therefor --producing--. |

Signed and Sealed this

Thirtieth Day of December, 1997

Attest:

BRUCE LEHMAN

Attesting Officer

Commissioner of Patents and Trademarks